United States Patent Office 3,667,929
Patented June 6, 1972

3,667,929
METHOD OF EFFECTING DISSOLUTION OF SOLUTES IN WATER AND COMPOSITIONS THEREFOR
George W. Fleming, Jr., P.O. Box 10372, Charlotte, N.C. 28201
No Drawing. Continuation-in-part of application Ser. No. 382,950, July 15, 1964. This application July 30, 1969, Ser. No. 846,274
Int. Cl. A01n 11/04; A61k 27/00; C05c 5/02
U.S. Cl. 71—67                                6 Claims

ABSTRACT OF THE DISCLOSURE

Aqueous solutions of uniform concentration throughout a vessel are produced without substantial agitation by providing a composition including a solute and an effervescent reaction mixture in finely divided form uniformly coated with a thin film of a slowly dispersible material, whereby upon addition to a vessel of water the mixture effervesces and the gas is entrapped to exert a buoyant effect whereby the bulk of the solute is dissolved in the upper reaches of the vessel and disperses throughout the vessel by gravity, yielding a solution of uniform concentration throughout the vessel. The method and composition therefore find particular utility in the field of veterinary medicines and agricultural chemicals which are employed in the form of aqueous solution.

---

This application is a continuation-in-part of application Ser. No. 382,950, filed July 15, 1964, now abandoned.

This invention relates to method and compositions for producing aqueous solutions of uniform concentration in a vessel without substantial external agitation.

There are many applications wherein aqueous solutions of uniform concentration are required and wherein the solute is only slowly soluble in water and wherein means to effect prolonged agitation to assure a uniform solution are not available. Such application, by way of example, includes solutions of agricultural chemicals used on farms and veterinary compositions. For example, animal and poultry growers frequently employ a batch watering system consisting of a storage tank which feeds by gravity to automatic watering devices. Frequently, the drinking water for such animals includes veterinary compositions such as anthelmintics or the like. A typical arrangement for a chicken house employs a 55 gallon drum as a storage tank. The grower adds the anthelmintic or other veterinary compositions to the water in the storage tank. It is important that the solution in the tank be of uniform concentration so that the dosage of the active material is uniform, that is, the first water withdrawn from the storage tank contains the same amount of material as the last portion. Many of these compositions are only slowly soluble in water, and particularly in cold weather, prolonged stirring or agitation is required to dissolve the material and effect uniform concentration throughout the storage tank.

It is an object of this invention to overcome the problem by providing a fast dissolving solute which yields a solution of uniform concentration throughout the vessel without requiring external agitation.

The composition of this invention includes a solute which has a density greater than that of water and an effervescent reaction mixture. The solute and reaction mixture are in finely divided form and are uniformly coated with a thin film of a slowly dispersible material. When the resulting composition is added to a vessel of water, the gas evolved from the effervescent mixture is entrapped and exerts a buoyant effect whereby the bulk of the dissolving action takes place at the top of the vessel. The resulting solution, being denser than water, then disperses itself throughout the vessel by gravity, resulting in a uniform solution with respect to the top and the bottom of the vessel.

The effervescent mixture preferably consists of an acid and a carbonate sufficient for producing the desired effervescence. For most applications the effervescing reactants are preferably in stoichiometric proportions, but it is apparent that an excess of either acid or carbonate may be used. If the desired solute itself is acidic (piperazine acid salt) the acid component may be omitted since the solute and the carbonate comprise the effervescent mixture. The carbonate salt may be any solid carbonate of alkali metals or ammonium, including bicarbonate. These include the carbonates and bicarbonates of sodium, potassium, lithium and ammonium. The acid component may be any water soluble solid acid, including citric acid, tartaric acid and fumaric acid, which are particularly appropriate for non-toxic formulations.

The solute, effervescent mixture and slowly dispersible coating material must be in finely divided form and must be thoroughly admixed. The mixing and coating are preferably accomplished by milling or grinding the ingredients. The materials are preferably ground to a particle size such that about 85% pass a 60 mesh screen.

It is within the scope of the invention to employ slurries or pastes in an anhydrous liquid carrier.

The coating material must be slowly soluble or dispersible in water. Convenient compounds for this purpose generally possess high molecular weights and/or contain long chain hydrophobic groups. Suitable examples of coating materials include, fatty acid soap, sodium stearate, polyethylene glycol of molecular weight on the order of 1,000, lauric acid, polypropylene glycol having a molecular weight on the order of 2,000, zinc stearate and alkyl aryl sulfonates.

The proportions of the ingredients are preferably of the following range:

|  | Percent |
| --- | --- |
| Solute | 10–90 |
| Effervescent mixture | 90–10 |
| Coating material | 0.01–2 |

The following examples illustrate the practice of the invention.

EXAMPLE I

Piperazine dihydrochloride, used as a chick vermicide, was added by the following procedure to a cold, 12 degree C., drinking water reservoir. The reservoir tank, 20 inches in diameter and 36 inches in depth, contained 190 kilograms of water. A dry powder was prepared by grinding 1135 grams of piperazine dihydrochloride, 227 grams of sodium bicarbonate and 0.2 gram of sodium stearate until 85 percent of the dry powder passed a 60 mesh screen. The dry powder was cast on the surface of the water in the reservoir without mechanical agitation of the liquid. After the elapse of 115 minutes, samples were withdrawn from the extreme upper, middle, and extreme lower regions of the reservoir and ratios of concentration of piperazine were determined to be 0.83:0.87:1.00::upper: middle:lower. When the same procedure was followed except that sodium stearate was deleted from the dry powder preparation, the concentration ratios were 0.22: 0.36:1.00. When the same procedure was followed except that sodium bicarbonate was deleted from the dry powder preparation, the concentration ratios were 0.20:0.40:1.00.

EXAMPLE II

Piperazine dihydrochloride, used as a chick vermicide, was added to a cold, 12 degree C., drinking water reservoir by the procedure described in Example I, except that 0.2 gram of zinc stearate was substituted for 0.2 gram of sodium stearate in the dry powder preparation. The concentration ratios of piperazine after an elapse of 75 minutes were 1.00:1.01:1.00.

EXAMPLE III

Piperazine dihydrochloride, used as a chick vermicide, was added to a cold, 12 degree C., drinking water reservoir by the procedure described in Example I, except that 0.2 gram of "Ultra-Wet," an alkyl aryl sulfonate, was substituted for 0.2 gram of sodium stearate in the dry powder preparation. The concentration ratios of piperazine after an elapse of 75 minutes were 0.63:0.70:1.00.

EXAMPLE IV

Piperazine dihydrochloride, used as a chick vermicide, was added to a cold, 15 degree C., drinking water reservoir by the procedure described in Example I, except that 0.1 gram of "Carbowax 1000" (a polyethylene glycol product of Union Carbide) was substituted for 0.2 gram of sodium stearate in the dry powder preparation. The concentration ratios of piperazine after an elapse of 75 minutes were 0.71:0.78:1.00.

EXAMPLE V

Copper sulfate, used as an algacide, was added to a cold, 12 degree C., water reservoir tank described in Example I. A dry powder was prepared by grinding 19 grams of anhydrous copper sulfate, one gram of sodium bicarbonate, one gram of citric acid, and 9.5 milligrams of lauric acid until 85 percent of the dry powder passed a 60 mesh screen. The dry powder was cast on the surface of the water in the reservoir without mechanical agitation of the liquid. After the elapse of 90 minutes, samples were withdrawn from extreme upper, middle, and extreme lower regions of the reservoir and ratios of concentrations of copper sulfate were determined to be 0.74:0.84:1.00::upper:middle:lower. When the same procedure was followed except that the lauric acid was deleted from the dry powder preparation the concentration ratios were 0.35:0.62:1.00.

EXAMPLE VI

Sodium nitrate, used as an ingredient in a foliar nutrient spray solution, was added to a cold, 16 degree C., water reservoir described in Example I. A dry powder was prepared by grinding together 2 kilograms of sodium nitrate, 425 grams of sodium bicarbonate, 425 grams of citric acid, and 1 gram of polypropylene glycol (Union Carbide designation No. 2025) until 85 percent of the dry powder passed a 60 mesh screen. The dry powder was cast on the surface of the water in the reservoir without mechanical agitation of the liquid. After the elapse of 90 minutes samples were withdrawn from the extreme upper, middle, and extreme lower regions of the reservoir and the ratios of concentrations of sodium nitrate were determined to be 0.76:0.83:1.00::upper:middle:lower. When the same procedure was followed except that the polypropylene glycol was deleted from the dry powder preparation, the concentration ratios were 0.28:0.58:1.00.

From the above examples it is apparent that substantial uniform top-to-bottom concentration of solute is achieved without any external agitation whatsoever.

While the invention finds particular utility in the agricultural field it is apparent that it is applicable to a wide variety of solutes wherein the presence of the reaction products of the effervescent mixture have no deleterious effect on the utility of the resultant solution.

I claim:

1. The method of obtaining a uniform concentration of solute selected from the group consisting of piperazine acid salt, copper sulfate and sodium nitrate dissolved in a vessel of water without substantial external agitation, said solute having an apparent density greater than that of water, which comprises thoroughly admixing and grinding said solute and an effervescent reaction mixture, said ingredients being in finely divided form and coated with a thin film of hydrophobic, slowly dispersible material, said mixture having a particle size such that about 85% pass a 60 mesh screen, the ingredients being in the following range of percentage by weight:

|  | Percent |
|---|---|
| Solute | 10–90 |
| Effervescent mixture | 90–10 |
| Hydrophobic material | 0.01–2 | whereby the resultant mixture, upon addition to a vessel of water, effervesces and the gas is entrapped to exert a buoyant effect on the mixture whereby the bulk of the solute is dissolved in the upper reaches of the vessel and uniformly distributes throughout the vessel by gravity.

2. The method set forth in claim 1 wherein said coating material is a fatty acid soap.

3. The method set forth in claim 1 wherein said effervescent mixture comprises an acid and a water soluble carbonate salt selected from the group consisting of alkali metal and ammonium carbonates, said acid and carbonate being present in substantially stoichiometric proportions.

4. The method set forth in claim 1 wherein said solute consists of piperazine dihydrochloride and the effervescent mixture consists of said solute and sodium bicarbonate.

5. The method set forth in claim 1 wherein said solute is copper sulfate.

6. A veterinary anthelmintic comprising a dry solid ground mixture of a water soluble anthelmintic acid salt of piperazine, a substantially stoichiometric amount of a water soluble carbonate salt selected from the group consisting of alkali metal and ammonium carbonates, said ingredients being in finely divided form and coated with a thin film of about 0.01–2% by weight of a hydrophobic slowly dispersible material, said mixture having a particle size such that about 85% pass a 60 mesh screen.

References Cited

UNITED STATES PATENTS

| 2,282,290 | 5/1942 | Swales | 424—44 |
| 3,082,091 | 3/1963 | Smith et al. | 424—44 |

OTHER REFERENCES

Surface Active Agents, Schwartz and Perry, Interscience Publishers Inc., New York (1949), p. 498.

Merck Index, 7th ed. (1960), pp. 302, 303 and 821.

SAM ROSEN, Primary Examiner

U.S. Cl. X.R.

71—59, 60; 424—31, 32, 38, 44, 250